March 12, 1935.  W. C. DENISON  1,994,171
FISHING DEVICE
Filed April 12, 1933
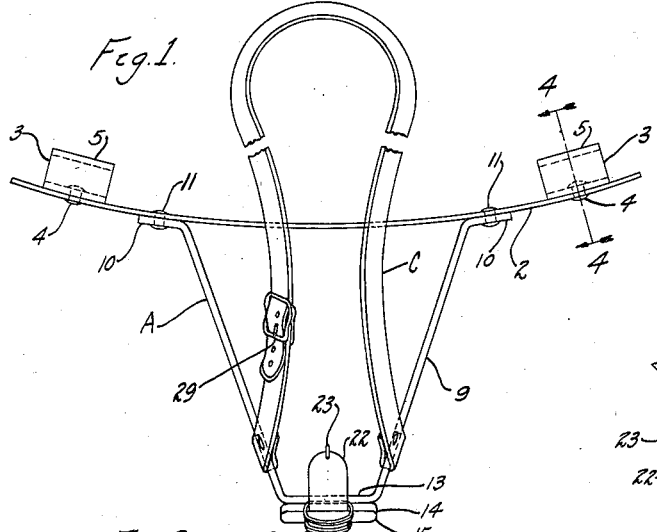
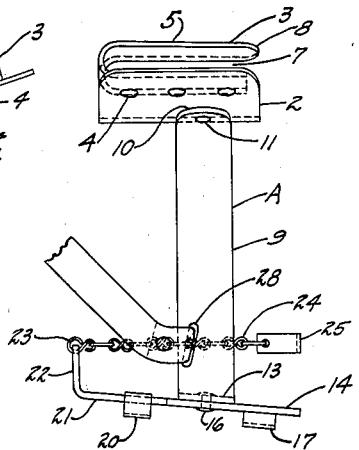
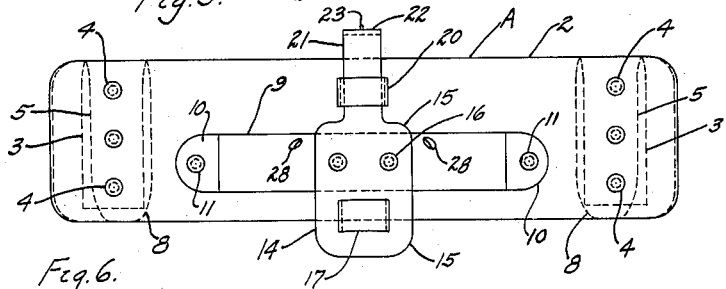
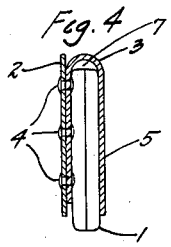
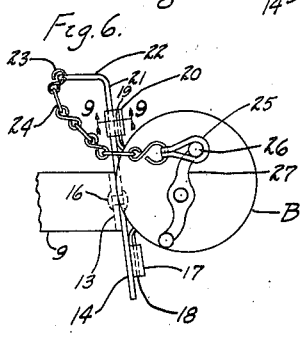
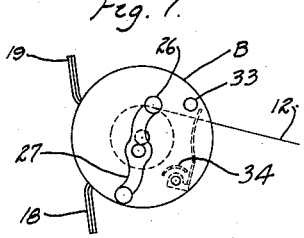
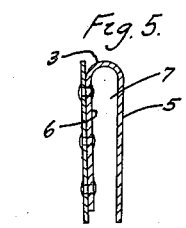
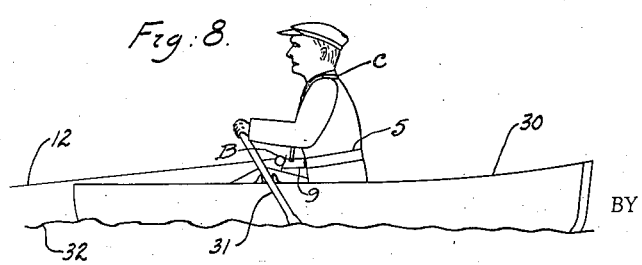
INVENTOR.
Wilfred C. Denison,
BY George B. Ingersoll.
ATTORNEY.

Patented Mar. 12, 1935

1,994,171

UNITED STATES PATENT OFFICE 1,994,171

FISHING DEVICE

Wilfred C. Denison, Dearborn, Mich.

Application April 12, 1933, Serial No. 665,662

12 Claims. (Cl. 224—5)

My invention relates to improvements in a fishing device for supporting a reel assembly; and the objects of my improvement are, first, to provide a fishing device for use in trolling fishing; second, to provide a fishing device for supporting a reel device without the necessity of using a fishing pole; third, to provide a fishing device with supporting means for engaging the conventional belt as worn by fisherman, etc; fourth, to provide a fishing device that can be readily removed from its supporting means on the body of the fisherman; fifth, to provide a fishing device having means for securing a reel device in a locked or non-reeling position; sixth, to provide a fishing device for supporting a reel device adjacent the center of the waist portion of a fisherman; seventh, to provide a fishing device adapted to support a reel device adjacent the waist of a fisherman, for either right or left hand operation; eighth, to provide a fishing device for supporting a reel device in a manner to permit both hands of a fisherman to be free for operating a boat; ninth, to provide a fishing device for supporting the support of a reel device at an angle relative to the perpendicular to permit a fishing line to extend angularly over the side of a boat and into the water; and tenth, to provide a fishing device supported on a belt adjacent the transverse central portion of the body of the fisherman and adjacent the shoulder portions of a fisherman.

I attain these objects by the mechanism illustrated in the accompanying drawing, in which—

Figure 1 is a plan view of the fishing device; Fig. 2, a side view of the fishing device; Fig. 3, a front view of the fishing device; Fig. 4, a vertical section of a portion of the fishing device on the line 4—4, Fig. 1, together with a portion of a belt for supporting same; Fig. 5, a section of the fishing device through one of its clamping members, said section being taken on the line 4—4, Fig. 1; Fig. 6, a partial side view of the fishing device together with the reel assembly mounted thereon; Fig. 7, an end view of the reel assembly as disclosed in its supported position in Fig. 6; Fig. 8, a view disclosing a fisherman in a boat, using the fishing device; and Fig. 9, a section through one of the loop members in its assembled position, said section being taken on the line 9—9, Fig. 6.

Similar numerals refer to similar parts throughout the several views.

My fishing device assembly A is adapted for mounting on the conventional belt 1 as usually worn by persons around the waist for supporting trousers and a section of the belt 1 is disclosed in Fig. 4, the section there disclosed showing the lapped or folded portions of the belt 1 when in its locked or buckled position. The plate or member 2 is constructed as a segment and is concaved at its inner side to conform to the shape of the belt 1 as conventionally worn around the waist. The member 2 is provided with the clamp or hook portions 3 at or adjacent its ends, the clamps 3 being suitably fastened, as by the rivets 4 or by spot welding or by similar means, to the member 2.

The clamps 3 are preferably formed with its inner portion 5 slightly inclined relative to its supporting portion 6, which is secured to the member 2, the portion 5 thus exerting a clamping action on the belt 1 and at the same time providing a space 7 having a slightly narrow area in its lower open end than at its closed upper end, thus enabling the clamp 3 to be resiliently forced over the belt and to maintain itself thereon, and at the same time permit the fishing device assembly A to be quickly removed as by pulling upwardly from its supported position on the belt 1.

Also the portion 5 of the clamp 3 has its lower end rounded as at 8 to avoid any tearing or injury to the clothing of the party wearing the fishing device assembly A when the fishing assembly A is assembled on the belt 1.

The bracket member 9 is preferably of substantially U shape as shown, and is provided with free ends or flange portions 10 which may be secured to the member 2 by the rivets 11 or by welding or by other suitable means. The bracket 9 is preferably located with its horizontal center line below the horizontal center line of the member 2 to provide a more secure mounting on the belt 1 as the pull of the line 12 will be slightly downward when the fishing device assembly A is used as shown in Fig. 8 and as hereinafter further disclosed. The bracket 9 also has its portion 13 formed to set at a slight angle as shown relative to the member 2, in order to enable the line 12 to be wound or unwound on the reel assembly B without contacting the spacing members 33 and 34. The inclination of the portion 13 thus positions the spacing members 33 and 34 of the reel assembly B with operating clearance space on each side of the line 12 when the reel assembly is being used in its conventional operating position.

The plate or bracket member 14 is preferably formed with the rounded corners 15 and is suitably secured to the portion 13 of the bracket 9 by the rivets 16 or by welding or other suitable means. The plate 14 may be provided with the loop or bracket portion 17 at or adjacent its lower end. The loop 17 may be a separate piece that will be fastened to the plate 14 or it may be formed integrally with the plate 14 by pressing a portion of the plate 14 outwardly, the loop 17 being adapted to receive the lower ear or bracket portion 18 of the reel assembly B, and the lower ear 18 is slipped between the loop 17 and the plate 14 and the upper ear 19 of the reel assembly B is secured in place by the loop 20 which is slidably mounted on the extension portion 21 of the plate 14, the loop 20 being slidably mounted on the extension portion 21 and enclosing both the body of the extension portion 21 and the upper ear 19 of the reel assembly B. The extension portion 21 of the plate 14 is further provided with the extension portion 22 and is provided with an opening in which is secured the end link 23 of the chain member 24 which is provided with the loop member 25 which is preferably constructed of leather, fabric, or similar material, to more efficiently adapt itself to the contour of the handle 26 of the operating lever 27 of the reel assembly B.

The chain 24 together with its loop 25 will thus enable the handle 26 of the operating lever 27 to be secured in proper positions as the line 12 is unwound fully for fishing purposes.

Also the chain 24, and the loop 25 will further prevent the handle 26 and the operating lever 27 from revolving through a complete revolution which would allow the line 12 to be snarled and tangled during the fishing operation or when winding or unwinding from the reel assembly B.

Also the chain 24 and the loop 25 will form a locking means which is very easily assembled or disassembled in its locking position. This is very necessary inasmuch as the operation of the reel assembly B must be efficiently and quickly handled during the fishing operation, especially when a strike is encountered, it being then necessary to immediately unhook the loop 25, and at the same time begin operating the handle 26 and the lever 27 to reel in the line 12.

The bracket 9 is provided with the apertures or openings 28 in which are suitably secured the ends of the strap assembly C. The strap assembly C may be constructed of leather, fabric, or other suitable material and is designed to be worn around the neck and shoulders of the fisherman. It is to be noted that the openings 28 in the bracket 9 are inclined slightly relative to the horizontal center line of the bracket 9 to move efficiently permit the strap assembly C to fit around the neck of the fisherman. The strap assembly C thus provides means for resisting any downward pull of the line 12 to the fishing device assembly A when a pull is exerted on the line 12 by a fish or other means, thus diverting a portion of the load from the belt 1 to the shoulder and neck portion of the fisherman. The strap assembly C thus further provides not only more secure support for the fishing device assembly A but also provides a quick means of taching the fishing device A from the body of the fisherman, it only being necessary in emergencies to raise the strap assembly C over the head of the fisherman and then the fishing device A can be quickly removed from the belt 1. Also the strap assembly C further provides a safety means to prevent the fishing device A from being jerked or pulled from the body of the fisherman into the water in the event that the fishing device A should come disengaged from the belt 1. The strap assembly C is provided with the buckle assembly 29 which will provide necessary adjustment for adapting the fishing device A and its strap assembly C to the body of any fisherman.

Figure 8 discloses my fishing device assembly A as worn or supported by a fisherman in the boat 30. It is to be especially noted that with the use of my fishing device assembly A, the fisherman will have both of his hands free for operating the oars 31 which is a distinct advantage over the usual method of fishing by trolling with a fish pole. Thus my fishing device A eliminates the necessity of purchasing or using a pole assembly, and at the same time provides an efficient, secure and easily operated supporting means for carrying a reel assembly for trolling purposes, and for providing the proper angular operating positions of the line 12 relative to the boat 30 and the water line 32, the line 12 extending over and clearing the end of the boat 30 in the usual trolling operation.

It is to be noted that the reel assembly B can be assembled with the handle 26 and lever 27 on either side by inverting the reel assembly B from its position as disclosed in Fig. 6, thus permitting the reel assembly B to be conveniently assembled on my fishing device for either right or left hand operation by the fisherman.

It is also to be noted that the fishing device can be constructed of light steel stock, aluminum, or similar material to provide a light weight assembly when supported on the central waist portion of the body of the fisherman.

I claim:

1. In a fishing device for supporting a reel assembly from a belt around the waist of a fisherman, the combination of a plate member adjacent the central front portion of the belt, said plate member being concaved at its inner side to fit the belt on the waist of the fisherman, clamp members suitably secured to said member and engaging the belt, said clamp members having an open end together with a closed end, the open end being narrower than the closed end of said clamp members, a substantially U shaped bracket having its free ends suitably secured to said member and provided with a pair of slots inclined relative to said plate member, a second plate member suitably supported at the outer side of said substantially U shaped bracket, said second plate member being provided with a loop portion for securing a portion of the reel assembly, said second plate member being further provided with an extension portion, a loop member slidably mounted on the extension portion of said second plate member for securing a portion of the reel assembly, a chain member provided with a flexible loop portion for engaging a portion of the reel assembly, said chain being suitably secured to the extension portion of said second plate member, and a strap assembly suitably connected with the slots of said U shaped bracet, said strap assembly extending around the neck and shoulders of the fisherman.

2. In a fishing device for supporting a reel assembly from the belt of a fisherman, the combination of a member provided with an inner concave surface adjacent the belt, means for attaching said member to the belt, a U shaped bracket having its free ends suitably secured to said member, the free ends of said U shaped bracket being oppositely disposed relative to the vertical center of the waist line of the fisherman, and means for securing the reel assembly, to the closed end of said U shaped bracket.

3. In a fishing device for supporting on a fisherman, a reel assembly provided with ear portions, the combination of a U shaped bracket member, a plate member suitably secured to said U shaped bracket member, said plate member being provided with a fixed loop portion for securing an ear portion of the reel assembly, said plate member being provided with an extension portion, a loop member slidably mounted on the extension portion of said plate member and adapted to secure an ear portion of the reel assembly said loop member being located above and in alignment with said fixed loop portion of said plate member, and means for attaching said U shaped bracket to the fisherman.

4. In a fishing device for supporting a reel assembly from a belt worn by a fisherman, the combination of a bracket member suitably secured at the central front portion of the belt and extending outwardly substantially at right angles therefrom, and means for attaching the reel assembly at the extremity of said bracket member, the reel assembly being thereby positioned to constitute the outermost portion of the fishing device to enable a line connected with the reel assembly to be solely supported and contacted by the reel assembly in the fishing operation.

5. In a fishing device for attaching to the belt of a fisherman for supporting a reel assembly, the combination of a member provided with a concaved inner surface to conform to the shape of the belt when assembled on the fisherman, clamping members suitably secured to said first mentioned member to attach said member to the belt of the fisherman, and a substantially U shaped bracket attached to said first mentioned member, and means for attaching the reel assembly at the outer side of said substantially U shaped bracket.

6. In a fishing device for supporting a reel assembly from the belt of a fisherman, the combination of a bracket member suitably mounted on and in alignment with the central portion of the belt of the fisherman, a second bracket member suitably supported on and in alignment with said first mentioned bracket member and provided with an outermost surface for receiving the reel assembly, and means for attaching the reel assembly to said outermost surface of said second bracket member and in alignment with said central portion of said belt, said reel assembly being located to extend substantially in a plane parallel to said outermost surface of said second bracket.

7. In a fishing device for supporting a reel assembly from a belt on a fisherman, the combination of a substantially U shaped bracket provided with means for attaching to the belt of the fisherman and having a closed side forming the outermost portion of said bracket, means for attaching the reel assembly to the closed side forming the outermost portion of said bracket, the axis of the reel assembly being located outwardly beyond said closed side of said bracket, and strap supporting means suitably attached to the side portions of said bracket and extending around the neck of the fisherman.

8. In a fishing device for supporting a reel assembly from the body of a fisherman, the combination of means suitably supported from the body of a fisherman comprising a substantially U shaped bracket having its free ends suitably anchored, and means for securing the reel assembly to the closed end of said substantially U shaped bracket.

9. In a fishing device for supporting a reel assembly on the belt of a fisherman, said reel assembly comprising end portions spaced by bar members and with a fish line extending therefrom, the combination of a U shaped bracket having an open end together with a closed end provided with a portion inclined at an angle relative to a vertical plane, a member closing the open side of said U shaped bracket and provided with means for attaching said member to the belt of the fisherman, and means for securing the reel assembly against said portion inclined at an angle on said U-shaped bracket to position the reel assembly so that said fish line may extend between said bar members of the reel assembly without interference during the fishing operation.

10. In a fishing device for supporting a reel assembly on a fisherman, the combination of a U shaped bracket having an open side together with a closed side, said U shaped bracket having slots extending through the side portions of said U shaped bracket, said slots being located nearer said closed side than said open side of said U shaped bracket, said slots being upwardly inclined toward the closed side of said U shaped bracket, a member closing said open side of said U-shaped bracket and having means for connection with the waist of the fisherman, and straps extending from the shoulders of the fisherman and engaging said slots of said U shaped bracket.

11. In a fishing device for supporting a reel assembly, provided with an operating handle, on the belt of a fisherman, the combination of means secured to the belt of the fisherman and having a plate member spaced from and in alignment with the central front portion of the belt, means for securing the reel assembly to and in alignment with said plate to permit the reel assembly to be located with its operating handle for either right or left hand operation thereof, and a flexible member provided with a loop member engaging the operating handle of the reel assembly to lock the reel assembly during the fishing operation, said flexible member being suitably secured to said plate to permit said loop member to engage the operating handle of the reel assembly in either right or left hand operating positions.

12. In a fishing device for supporting, from the belt of a fisherman, a reel assembly, provided with an operating handle, the combination of a supporting member provided with an inclined reel supporting portion having an extension portion extending rearwardly toward the fisherman, said reel supporting portion being located substantially in alignment with the central portion of said belt, said supporting member being provided with means for attachment to said belt, means for securing the reel assembly to said inclined reel supporting portion of said supporting member in either right or left hand operating positions, and locking means suitably secured to said extension portion of said supporting member, said locking means having a loop member for engaging the operating handle of the reel assembly in either right or left hand operating positions.

WILFRED C. DENISON.